US009457900B1

(12) United States Patent
Jones et al.

(10) Patent No.: US 9,457,900 B1
(45) Date of Patent: Oct. 4, 2016

(54) MULTIROTOR MOBILE BUOY FOR PERSISTENT SURFACE AND UNDERWATER EXPLORATION

(71) Applicant: The United States of America, as represented by the Secretary of the Navy, Washington, DC (US)

(72) Inventors: Kevin D. Jones, Seaside, CA (US); Vladmir N. Dobrokhodov, Seaside, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/073,831

(22) Filed: Mar. 18, 2016

Related U.S. Application Data (63) Continuation-in-part of application No. 14/246,611, filed on Apr. 7, 2014, now Pat. No. 9,321,529.

(51) Int. Cl.
*B64G 1/00* (2006.01)
*B64C 39/02* (2006.01)
(Continued)

(52) U.S. Cl.
CPC ............... *B64C 39/02* (2013.01); *B63B 22/00* (2013.01); *B64C 25/54* (2013.01); *B64C 27/08* (2013.01);
(Continued)

(58) Field of Classification Search
CPC ..... B64C 39/02; B64C 39/022; B64C 27/08; B64C 2201/18; B64C 2201/042
USPC .......................................... 440/6; 441/6, 21
See application file for complete search history.

(56) References Cited

U.S. PATENT DOCUMENTS 3,773,278 A    11/1973   Bergunder
4,962,488 A * 10/1990   Dell-Imagine ........... H01Q 1/04
                                                           343/709
(Continued)

FOREIGN PATENT DOCUMENTS

EP          2213570 A2    8/2010
WO     2012037174 A2    3/2012
WO     2013024258 A1    2/2013

OTHER PUBLICATIONS

Wikipedia Amphibious Helicopter Page, http://en.wikipedia.org/wiki/Amphibious_helicopter (accessed Mar. 12, 2014).
(Continued)

*Primary Examiner* — Richard G Davis
(74) *Attorney, Agent, or Firm* — Naval Postgraduate School; James B. Potts; Lisa A. Norris (57) ABSTRACT

A multirotor mobile buoy combining MR-VTOL capability with environmentally hardened electronics, exchangeable sensor suites, and a solar recharge system and providing sensing in aquatic environments. The multirotor mobile buoy provides for the detection, classification and location of underwater objects using self-contained electronics, and repositions with aerial means using a plurality of rotors. The multirotor mobile buoy additionally incorporates solar panels for recharging of on-board batteries enabling the flight and other functions, and comprises a buoyant assembly and extended tether in order to promote stability in dynamic, open ocean environments. The multirotor mobile buoy may be employed singly or as a swarm of underwater detection platforms, and may utilize its positioning ability to optimize the effectiveness of sonobuoy systems arrayed as a distributed sensor field.

15 Claims, 5 Drawing Sheets

(51) Int. Cl.
*B64C 27/08* (2006.01)
*B64C 25/54* (2006.01)
*B63B 22/00* (2006.01)

(52) U.S. Cl.
CPC ....... *B64C 39/022* (2013.01); *B64C 2201/024* (2013.01); *B64C 2201/108* (2013.01); *B64C 2201/12* (2013.01)

(56) References Cited

U.S. PATENT DOCUMENTS

| | | | |
|---|---|---|---|
| 6,270,038 | B1 | 8/2001 | Cycon et al. |
| 6,604,706 | B1 | 8/2003 | Bostan |
| 7,924,654 | B1 | 4/2011 | Stottlemyer et al. |
| 8,220,737 | B2 | 7/2012 | Wood et al. |
| 8,492,692 | B2 | 7/2013 | Fisher |
| 2009/0224099 | A1* | 9/2009 | Steele .................. B64C 39/024 244/1 TD |
| 2011/0226174 | A1* | 9/2011 | Parks .................. B60F 5/02 114/313 |
| 2012/0056041 | A1 | 3/2012 | Rhee et al. |
| 2014/0061376 | A1* | 3/2014 | Fisher .................. B60K 1/00 244/62 |

OTHER PUBLICATIONS

Gull UAV Capabilities Page, http://www.warrioraero.com/GULL/capabilities.htm (accessed Mar. 12, 2014).

"Drowned Drones: When a Multicopter Hits the Water," Eric Cheng, Make:, Jan. 22, 2014, http://makezine.com/magazine/drowned-drones-when-a-multicopter-hits-the-water/ (accessed Mar. 12, 2014).

"Doing Their Part: Drifter Buoys Provide Ground Truth for Climate Data," Climate.gov, May 16, 2013, http://www.climate.gov/news-features/climate-tech/doing-their-part-drifter-buoys-provide-ground-truth-climate-data (accessed Mar. 12, 2014).

"Amazon drones: A flying robot may deliver your Christmas gifts in four or five years," Matt McFarland, The Washington Post, Dec. 2, 2013 http://www.washingtonpost.com/blogs/innovations/wp/2013/12/02/amazon-drones-a-flying-robot-may-deliver-your-christmas-gifts-in-four-or-five-years/ (accessed Mar. 13, 2014).

"Warrior Aero Gull36 unmanned seaplane heads for the open sea," Barnard Microsystems site, http://www.barnardmicrosystems.com/UAV/milestones/sea_plane.html (accessed Mar. 14, 2014).

* cited by examiner

MULTIROTOR MOBILE BUOY FOR PERSISTENT SURFACE AND UNDERWATER EXPLORATION

RELATION TO OTHER APPLICATIONS

This patent application claims priority from nonprovisional patent application Ser. No. 14/246,611 filed Apr. 7, 2014, which is hereby incorporated by reference in its entirety.

FIELD OF THE INVENTION

One or more embodiments relates to a sonobuoy for the detection of underwater objects in a manner incorporating self-contained electronics, a plurality of on-board rotors for aerial positioning, and solar panels for solar energy harvesting and energy-independent operation.

BACKGROUND

Sonobuoys are expendable underwater listening devices typically employed for the detection, classification and location of underwater objects. Although models and capabilities vary, sonobuoys generally include a float, radio transmitter, a battery and a hydrophone attached to a wire for detecting sound under water. In its simplest form, the sonobuoy is a compact, self-contained package of electronics designed to be enter the water, separate into an underwater acoustic sensor and an on-the-surface radio transmitter, and relay the underwater acoustic signals it detects to some external system, where the radio frequency (RF) transmission is received and processed to detect and locate a detected object.

Sonobuoys generally lack the means for effective self-positioning, and current- and wind-induced drift of sonobuoys can have a detrimental impact on the effectiveness of sonobuoy systems arrayed as a distributed sensor field. Not only can the sonobuoys drift away from the area-of-interest, but buoy movement relative to other buoys in the field can reduce field integrity by creating coverage gaps in the field or clustering too many buoys in one area. Despite the significant advances made in the underwater detections, the most significant gaps still exist in the areas of responsive mobility and timely communication of acquired contacts; in short, it takes too long to communicate the positively detected signatures to external systems. Low bandwidth and operational range of communication links, and low mobility of the undersurface autonomous platforms within the existing onboard energy budgets are the key constraining factors of the current state of the art of sonobuoy technology.

Provided here is a multirotor mobile buoy providing for the detection, classification and location of underwater objects using self-contained electronics, and able to reposition by aerial means using a plurality of rotors. The multirotor mobile buoy additionally incorporates solar panels for recharging of on-board batteries enabling the flight and other functions, and comprises a buoyant assembly and extended tether in order to promote stability in dynamic, open ocean environments. The multirotor mobile buoy may be employed singly or as a swarm of underwater detection platforms, and may utilize its positioning ability to optimize the effectiveness of sonobuoy systems arrayed as a distributed sensor field.

These and other objects, aspects, and advantages of the present disclosure will become better understood with reference to the accompanying description and claims.

SUMMARY

The disclosure provides a multirotor mobile buoy combining MR-VTOL capability with environmentally hardened electronics, exchangeable sensor suites, and a solar recharge system in order to provide long endurance sensing in aquatic environments. The multirotor mobile buoy may perform sensing below the thermocline layer while riding on ocean currents, and utilizes a plurality of VTOL-oriented rotors when required for rapid aerial relocation. The multirotor mobile buoy provides INS/GPS capability and sensing and signal processing capabilities for detection of underwater objects, as well as solar energy harvesting for energy-independent operation. The multirotor mobile buoy may be deployed as a plurality of multiple cooperative vehicles in a particular operational area with heterogeneous sensors and may, for example, distribute themselves to guarantee a required node-density for a given desired coverage.

The multirotor mobile buoy comprises a central frame comprising a central housing, a plurality of frame support members extending from the central housing, a plurality of rotor support members. A buoyant assembly couples to the central frame and is arranged to promote stability in wave environments. A rotor couples each rotor support member, and the rotor support members, central housing, and buoyant assembly are coupled such that the rotating mast, hub, and rotor blades of the rotor are above the water and oriented to direct a thrust in a direction toward the surface of the water.

The multirotor mobile buoy further comprises solar cells coupled to the frame support members such that a sun-facing side of the solar cell is above the water when the buoyant assembly floats on water. Additionally, a battery is electrically connected to each solar cell and each rotor to enable aerial flight. A tether couples to the central housing and deploys a sensor configured to detect underwater objects.

The novel apparatus and principles of operation are further discussed in the following description.

Embodiments in accordance with the invention are further described herein with reference to the drawings.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a multirotor mobile buoy capable of underwater detections and repositioning utilizing Multi-Rotor Vertical Take Off and Landing (MR-VTOL) capability.

The disclosure provides a novel autonomous vehicle combining MR-VTOL capability with environmentally hardened electronics, exchangeable sensor suites, and a solar recharge system in order to provide long endurance sensing in aquatic environments. The vehicle performs sensing below the thermocline layer while riding on ocean currents, and flying in the air when required for rapid relocation or local communication with similar cooperative nodes. The vehicle instrumentation typically combines INS/GPS and aircraft control, data processing, and the command and control (C2) capabilities of a VTOL aircraft with the sensing and signal processing capabilities of an underwater robot with a vector sensor suspended below the thermocline, as well as solar energy harvesting for energy-independent operation. The multirotor mobile buoy may be deployed as a plurality of multiple cooperative vehicles in a particular operational area with heterogeneous sensors and may, for example, distribute themselves to guarantee a required node-density for a given desired coverage.

Figure 1A:
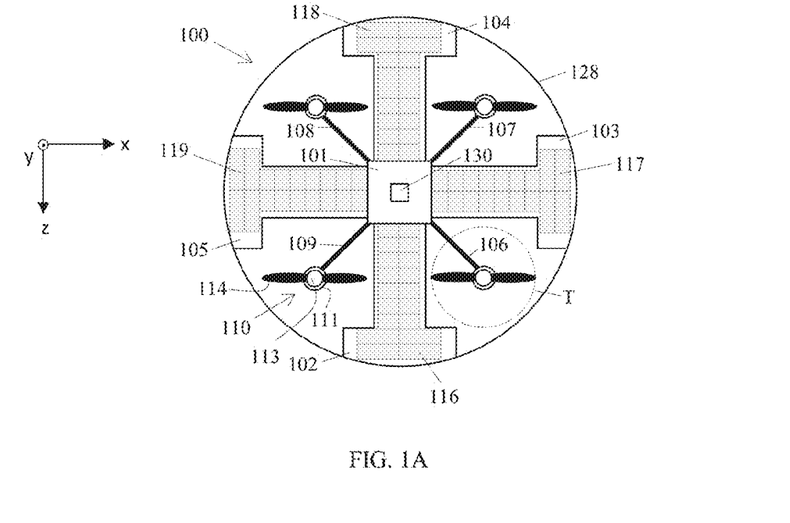
FIG. 1A illustrates a view of an embodiment of the multirotor mobile buoy.
Figure 1B:
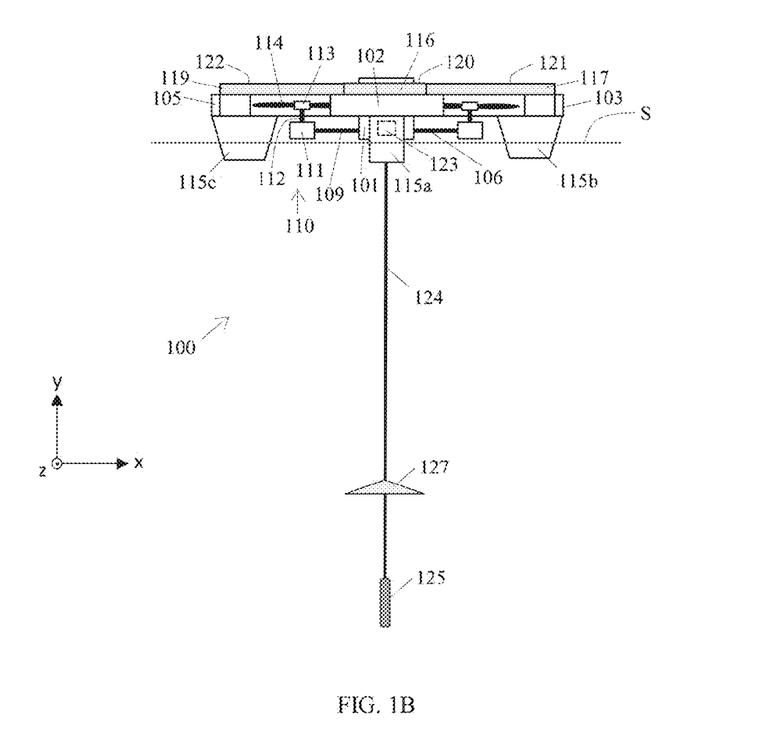
FIG. 1B illustrates another view of an embodiment of the multirotor mobile buoy.

A particular embodiment of the multirotor mobile buoy is represented at FIGS. 1A and 1B and indicated generally as 100, with views in accordance with the axes shown The multirotor mobile buoy is generally represented at 100 and incorporates a central frame comprising a central housing 101, a plurality of frame members such as 102, 103, 104, and 105, and a plurality of rotor support members such as 106, 107, 108, and 109. Typically central housing 101 is a water tight enclosure surrounding an internal volume. The plurality of frame members 102, 103, 104, and 105 extend from central housing 101 in a generally radial fashion, as illustrated. The plurality of rotor support members 106, 107, 108, and 109 are coupled either to the central housing, one of the frame support members, or some combination thereof so that the rotor frame behaves as a substantially rigid collection. For example at FIG. 1A, every rotor support member 106, 107, 108, or 109 is coupled to central housing 101 by fixed attachment and extends from central housing 101 in such a manner that the rotor support member is interposed between a first frame member and a second frame member. Additionally, a buoyant assembly indicated by 115a, 115b, and 115e is coupled to the central frame, as illustrated at FIG. 1B. The buoyant assembly is typically fixably attached to the rotor frame and is configured to float on water. For example, FIG. 1B illustrates buoyant assembly members 115a, 115b, and 115c floating on water surface S.

Multirotor mobile buoy 100 additionally comprises a plurality of rotors such as the rotor generally indicated by 110, in order to provide for flight capability of multirotor mobile buoy 100. Multirotor mobile buoy 100 indicates four rotors, however any desired number of rotors may be utilized as a design choice. Rotor 110 comprises motor 111, rotating mast 112, hub 113, and a plurality of rotor blades 114, where motor 111 is coupled to an generates rotation of rotating mast 112, and rotating mast 112 is fixably attached to hub 113, such that rotation of motor 111 generates subsequent rotation of the rotor blades 114 in some plane of rotation. Such rotor systems are well known in the art. See e.g., Federal Aviation Administration, *Helicopter Flying Handbook* (FAA-H-8083-21A) (2012), among others. Each rotor is coupled to at least one of the rotor support members 106-109. Additionally, the each of the rotor support members 106-109 are coupled to central housing 101 and/or at least one of the frame support members 102-105, and the buoyant assembly 115a, 115b, and 115c is coupled to the rotor frame, such that the combination of the coupling maintains the plurality of rotor blades 114 both above the water surface S and in a position to direct thrust toward the water surface S when the buoyant assembly floats on water. This is additionally illustrated at FIGS. 1A and 1B, where rotor 110 is fixably attached to rotor support member 109 and rotor support member 109 is fixably attached to central housing 101 such that rotor blades 114 are above water surface S and oriented to direct thrust generally in a negative direction of the y-axis when the buoyant assembly 115a, 115b, and 115c floats on the water surface S. In a particular embodiment, the rotor blades have a propeller pitch such a rotation of the blade around the tip-path P generates a displacement in the positive direction of the y-axes of FIGS. 1A and 1B, and generally away from water surface S.

Multirotor mobile buoy 100 additionally comprises a plurality of solar cells such as 116, 117, 118, and 119. Each solar cell is coupled to at least one of the frame support members 102-105 and comprises a sun-facing side, such as sun-facing side 120 of solar cell 116, sun-facing side 121 of solar cell 117, and sun-facing side 122 of solar cell 119 at FIG. 1B. As is understood, solar cells are electrical devices intended to concert the energy of light into electricity by the photoelectric effect and are well known in the art. See e.g. Wurfel, P., *Physics of Solar Cells: From Basic Principles to Advanced Concepts*, (2009), among others. The solar cells are coupled to the frame members, the frame members extend from the central housing, and the buoyant assembly is coupled to the rotor frame such that the sun-facing sides of the solar cells are above the water when the buoyant assembly floats on water. For example, at FIG. 1B, solar panel 117 is coupled to frame support 103 and frame support 103 extends from central housing 101 in such a manner that sun-facing surface 121 of solar panel 117 is above the water surface S when the buoyant assembly 115a, 115b, and 115c floats on the water surface S.

Multirotor mobile buoy 100 further comprises a battery 123 electrically connected to the solar cells and electrically connected to each motor in the plurality of rotors, in order that battery 123 may be charged from the solar cells and deliver power to the rotors to facilitate buoy mobility. In some embodiments, battery 123 is housed within the internal volume of central housing 101, as illustrated. In addition to solar panels 116, 117, 118, and 119, power may be generated by other mechanisms. For instance, a fan (not shown) extending above multirotor mobile buoy 100 from any desired attachment location may capture wind energy to charge battery 123.

Multirotor mobile buoy 100 further comprises a tether 124 extending generally from central housing 101 to a sensor 125 configured to detect underwater objects. Sensor 125 is configured to sink in water such that tether 124 generally hangs beneath the rotor frame when when the buoyant assembly floats on water. Multirotor mobile buoy 100 typically comprises some means for deploying tether 124, such as a winch which provides for reel-out and/or reel-in when desired, or a latching mechanism which may release tether 124 and allow tether 124 to extend from gravitational forces on sensor 125. Once deployed, it is generally not required to stow tether 124 prior to multirotor mobile buoy 100 engaging in flight. In some embodiments, tether 124 further comprises motion dampening unit 127. In a typical embodiment, multirotor mobile buoy additionally comprises a computing system 130 where the computing system is configured to receive data from sensor 125. In a further embodiment, computing system 130 receives data via a communication cable extending between computing system 127 and sensor 125. The communication cable may be an integral part of tether 124 or otherwise independent. Tether 124 is generally a flexible cable of extended length to allow sensing below thermoclines as the rotor frame of multirotor mobile buoy 100 remains above the water surface.

In some embodiments, multirotor mobile buoy 100 additionally comprises an external support member 128 fixably attached to one or more frame members. External support member 128 may generally surround the plurality of rotors in a manner to provide protection as the buoyant assembly generates floatation or otherwise, and/or provide additional support for the plurality of solar panels, or be utilized for other functions to enhance the operation of multirotor mobile buoy 100.

Figure 2:
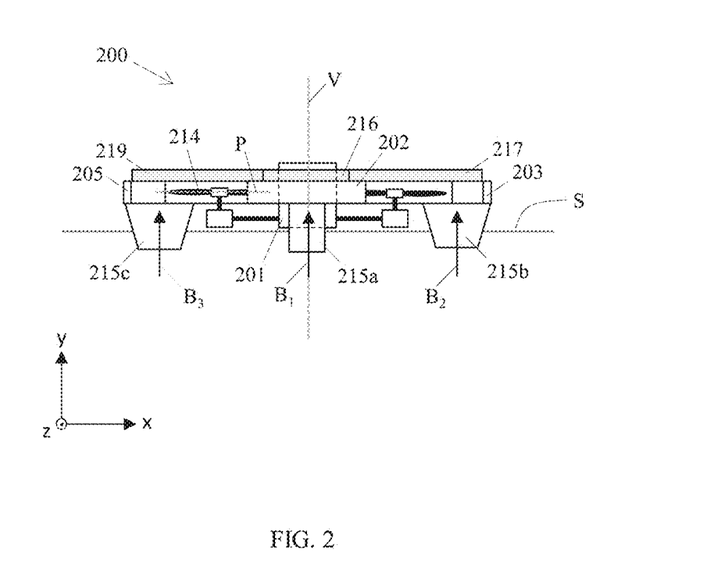
FIG. 2 illustrates an orientation of the buoyant assembly and plurality of rotors.

As discussed, multirotor mobile buoy 100 integrates a number of technologies for propulsion, energy harvesting and storage, signal processing, and communication all into a single platform for tracking underwater objects. Since multirotor mobile buoy 100 may operate in dynamic ocean environments, multirotor mobile buoy 100 also incorporates positive buoyancy and a high degree of stability. Toward this end, the pendulum-like nature of tether 124 and sensor 125 assists in self-righting behavior. In addition and as discussed, the buoyant assembly is coupled to the rotor frame in such a manner, as the buoyant assembly floats on water, the rotor blades are both above the water surface and oriented to direct thrust toward the water surface, and the sun-facing sides of the solar cells are above the water surface. To facilitate this arrangement in a particular embodiment, the central housing has a vertical axis and the buoyant assembly generates buoyant forces which are substantially parallel to the vertical axis, and each plurality of rotor blades has a plane of rotation substantially perpendicular to the vertical axis. For example, FIG. 2 illustrates selected components of multirotor mobile buoy 200 specifically indicating central housing 201, frame support member 202 supporting solar panel 216, frame support member 203 supporting solar panel 217, and frame support member 205 supporting solar panel 219. Central housing 201 is positioned similarly to central housing 101 of FIG. 1A as indicated by hidden lines, and frame support members 202, 203, and 205 extend from central housing 201. Multirotor mobile buoy 200 further comprises a fourth frame support member (not shown) analogous to frame support member 104 of FIG. 1A. Additionally, multirotor mobile buoy 200 comprises a buoyant assembly indicated by 215a, 215b, and 215c, where 215a, 215b, and 215c are coupled to frame support members 202, 203, and 205 respectively. As illustrated, as the buoyant assembly floats on water surface S, a vertical axis V extends through central housing 201 in an orientation parallel to the y-axis indicated as buoyant assembly components 215a, 215b, and 215c generate distributed buoyant forces represented by $B_1$, $B_2$, and $B_3$ in directions parallel to vertical axis V. Additionally, rotor blades 214 are above water surface S and have a plane of rotation P substantially perpendicular to vertical axis V. Here, "substantially perpendicular" means that a first direction vector lies within the plane of rotation P and a second direction vector is parallel to vertical axis V, and the angle between the first direction vector and the second direction vector is at least 75 degrees, preferably at least 80 degrees, and more preferably at least 85 degrees. In another embodiment, rotor blades 214 have a propeller pitch such a rotation of rotor blades 214 generates a displacement substantially parallel to the vertical axis V. Here, "substantially parallel" means that a first direction vector is parallel to the displacement generated and a second direction vector is parallel to vertical axis V, and the angle between the first direction vector and the second direction vector is less than 15 degrees, preferably less than 10 degrees, and more preferably less than 5 degrees.

Additionally, as has been indicated, in some embodiments, the buoyant assembly provides an outrigger-style stability by utilizing a plurality of pontoon-type flotation devices coupled to the frame support members, such as pontoons 215a, 215b, and 215c coupled to frame support members 202, 203, and 205 respectively. Typically, a multirotor mobile buoy such as that shown at FIG. 2 would additionally incorporate a pontoon coupled to each support member. For example, at FIG. 1A, in certain embodiments, the buoyant assembly might incorporate a pontoon coupled to each of frame support member 102, 103, 104, and 105. Such an arrangement promotes stability via distributed buoyancy and by taking advantage of the weighted water plane area for righting moments, and increases stiffness during roll. In a particular embodiment, stability is promoted by providing pontoons sufficient to provide buoyant forces to mitigate pontoon effects and tendencies toward capsize when lateral forces are applied. In some embodiments, the multirotor mobile buoy has a total combined weight and each pontoon in a plurality of pontoons has a displacement volume of water when completely submerged, and the weight of water having a volume equal to the displacement volume is at least 70%, preferably at least 80%, and more preferably greater than the total combined weight of the apparatus.

It is understood that the buoyant assembly illustrated is exemplary only. The buoyant assembly may take any form sufficient provide buoyancy in a manner which maintains the relationship of other components as described.

Figure 3A:
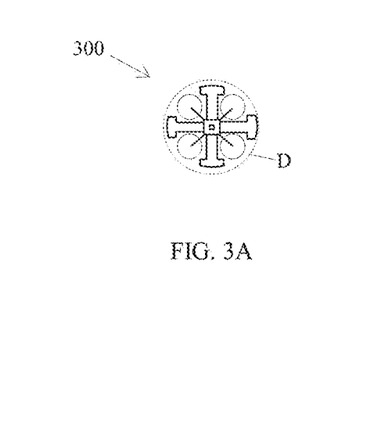
FIG. 3A illustrates a view of the multirotor mobile buoy and deployed sensor.
Figure 3B:
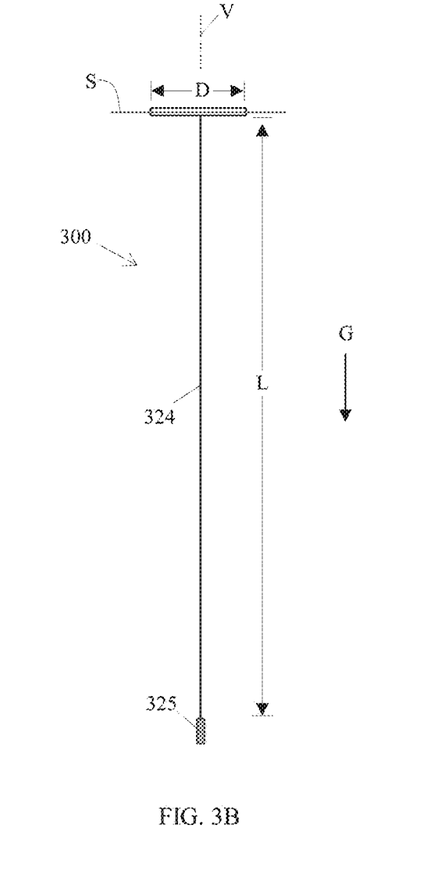
FIG. 3B illustrates another view of the multirotor mobile buoy and deployed sensor.

As discussed, the tether is generally a flexible cable of extended length to allow sensing below thermoclines as the central frame of the multirotor mobile buoy generally remains above the water surface. In a particular embodiment illustrated at FIGS. 3A and 3B, a reference diameter D is perpendicular to the vertical axis V and surrounds the central frame and the buoyant assembly of multirotor mobile buoy 300, and the tether 324 has a length L from the central housing to the sensor 325 with the length L at least 3 times, preferably at least 10 times, and more preferably at least 15 times greater than the reference diameter D. In addition to providing for deeper sensor deployments, the length of tether 324 and mass of sensor 325 may also act to shift the center of gravity of multirotor mobile buoy 300 closer to or below the center of buoyancy of the buoyant apparatus to promote increased stability. See e.g., C. B Barrass and D. R. Derret, *Ship Stability for Master and Mates* (2012), among others. For example, at FIG. 3B where multirotor mobile buoy is subject to the gravity vector G while the buoyant assembly floats on water and defines a center of buoyancy, sensor 324 may be extended using tether 324 to some length L, where the length L and the mass of submerged sensor 324 combine to influence the center of gravity for the multirotor mobile buoy such that the center of gravity is below the center of buoyancy, where here "below" means displaced in the direction of the gravity vector G. Such an arrangement may significantly enhance stability in environments subject to surface wave action, such as an open ocean environment. Correspondingly, in a particular embodiment, the length of the tether and the mass of the sensor comprising the multirotor mobile buoy is sufficient to generate a center of gravity of the multirotor mobile buoy below the center of buoyancy of the multirotor mobile buoy, when multirotor mobile buoy is subject to a gravity vector and while the buoyant assembly floats on water and defines a center of buoyancy. In another embodiment, the resultant gravity force of the multirotor mobile buoy acting through the center of gravity has a first direction vector and the resultant buoyant force of the buoyant assembly acting through the center of buoyancy has a second direction vector, and the first and second direction vector intersect a circular area perpendicular to the vertical axis V and having a diameter of less than 10% of the reference diameter D.

Figure 4:
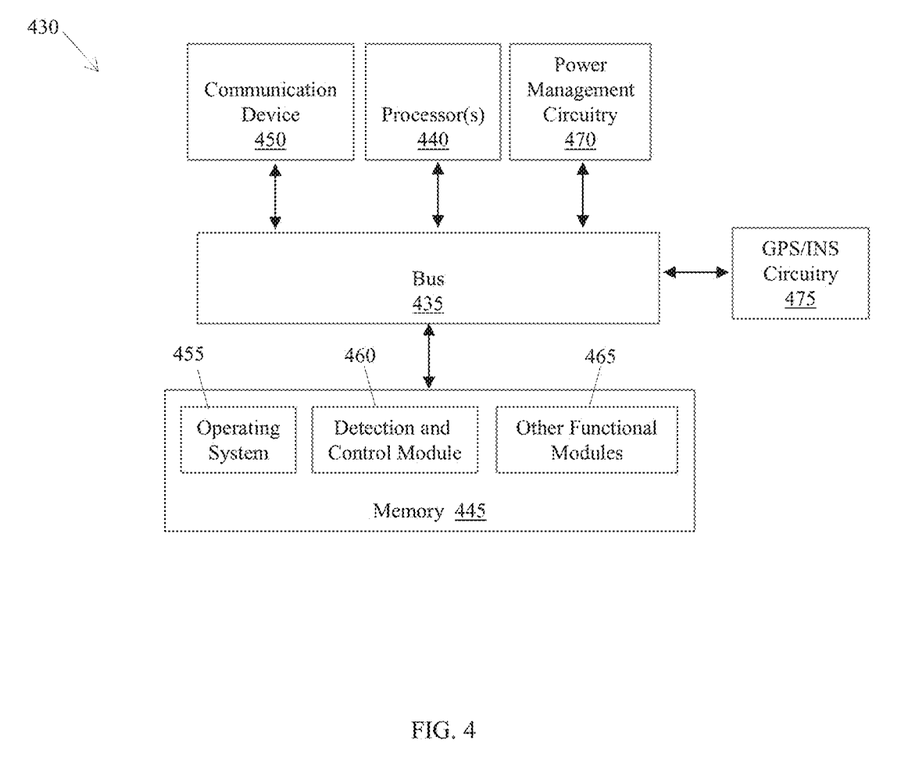
FIG. 4 illustrates an embodiment of a computing system for the multirotor mobile buoy.

In certain embodiments multirotor mobile buoy 100 comprises computing system 130, and in some embodiments an onboard global positioning system and inertial navigation system (GPS/INS) provides position information for multirotor mobile buoy 100. The GPS/INS in concert with computing system 130 may provide autopilot functionality that positions multirotor mobile buoy 100 in accordance with provided instructions. For example, a plurality of multirotor mobile buoys may be positioned in a geographic grid in any desired two dimensional pattern and spacing. As an example FIG. 4 is a block diagram of a computing system 430 configured to control a multirotor mobile buoy, according to an embodiment of the present invention. Computing system 430 includes a bus 435 or other communication mechanism for communicating information, and processor(s) 440 coupled to bus 435 for processing information. Processors 440 may be any type of general or specific purpose processor, including a central processing unit ("CPU") or application specific integrated circuit ("ASIC"). Processor(s) 440 may also have multiple processing cores, and at least some of the cores may be configured to perform specific functions. Computing system 430 further includes a memory 445 for storing information and instructions to be executed by processor(s) 440. Memory 445 can be comprised of any combination of random access memory ("RAM"), read only memory ("ROM"), flash memory, cache, static storage such a magnetic or optical disk, or any other types of non-transitory computer-readable media or combinations thereof. Additionally, computing system 430 includes a communication device 450, such as a transceiver and antenna, to wirelessly provide access to a communications network.

Non-transitory computer-readable media may be any available media that can be accessed by processor(s) 440 and may include both volatile and non-volatile media, removable and non-removable media, and communication media. Communication media may include computer-readable instructions, data structures, program modules or other transport mechanism and includes any information delivery media. Memory 445 stores software modules that provide functionality when executed by processor(s) 440. The modules include an operating system 455 for computing system 430. The modules further include a detection and control module 460 that is configured to detect underwater objects and control operation of the buoy. Computing system 430 may include one or more additional functional modules 465 that include additional functionality. Power management circuitry 470 is responsible for accumulation of energy from solar panels and its distribution to the onboard instrumentation and the propulsion that enables aerial mobility (e.g., rotors) in this embodiment. GPS/INS 475 provides position information for computing system 430 in this embodiment.

One skilled in the art will appreciate that a "system" could be embodied as an embedded system, a personal computer, a server, a console, a personal digital assistant ("PDA"), a cell phone, a tablet computing device, or any other suitable computing device, or combination of devices, capable of providing processing functionality for the buoy. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The multirotor mobile buoy disclosed provides a platform that is highly controllable, agile, and simple to maintain. Further, wireless mesh communication and the minimal production cost of multicopters may facilitate the use of multiple quadrotors, which opens the door to cooperative and swarm behaviors over a broad spectrum of missions. They have relatively high efficiency for vertical takeoff and landing (VTOL) platforms and can precisely control their attitude with motor speed changes. The brushless motors in each rotor have essentially no wear parts and are tolerant of wet environments. This makes them highly reliable with only four moving parts when in a quad-rotor configuration. Further, a plurality of multirotor mobile buoys can be employed as a distributed sensor network. The use of dispersed sensors in this manner generates great operational flexibility, since they can be arranged and configured to maximize the group capability. Track of an underwater object can be maintained using a single sensor, but the position error is greatly reduced by increasing the number of platforms sharing their individual measurements. This improves the accuracy of a final position estimate. Additionally, multirotor mobile buoy's position above the waterline facilitates air-based communication.

The use of multirotor mobile buoys also allows for rapid repositioning at speeds higher than those typically seen in underwater platforms. This helps to ensure greater continuous coverage of the target being tracked and facilitates maintaining closer proximity to the moving target. The multirotor mobile buoy may travel through a series of flight and drifting segments. This provides minimization of energy expenditure via computationally feasible path planning that utilizes a priori given or in-situ measured ocean currents. The approach accounts for the fact that, due to the constrained battery capacity, the multirotor mobile buoys may primarily drift while conducting their surveillance mission, but may fly for periodic repositioning, obstacle avoidance, and inter-node communication. Therefore, with known currents and the desired final position of each vehicle, the onboard path planning algorithm will find a path that minimizes the total energy expended. See U.S. patent application Ser. No. 14/246,611 filed Apr. 7, 2014, filed by Jones et al.; see also Chase H. Dilliard, "Energy-efficient underwater surveillance by means of hybrid aquacopters," (M.S.thesis, Naval Postgraduate School, 2014).

In swarm embodiments, individual multirotor mobile buoys may communicate with one another to establish the direction, speed, and depth of underwater objects. While active sonar may be used, many embodiments may use passive sensors and sensing techniques since these sensors tend to be smaller, lighter, and require less power. Passive sensors may also be capable of inferring size based on signal strength, but would likely not be capable of producing a sonar-like estimate of vehicle shape and size. Multirotor mobile buoys may also collectively move to track and match pace with a given object. Alternatively, in a group comprising multirotor mobile buoys, certain buoys may be capable of flying and others may not. Multirotor mobile buoys with a flying configuration may match pace with, and follow the underwater object and those without such a configuration may communicate with multirotor mobile buoys. Buoys that do not fly may be larger and have more advanced sensing equipment while flying multirotor mobile buoys may be designed to increase flying range and/or speed. In certain embodiments, multirotor mobile buoys may lack equipment other than that required for flight and communications. When buoys are specialized, they may detect different frequency ranges, use different sensing technologies, and or have any other equipment package as a matter of design choice.

Figure 5:
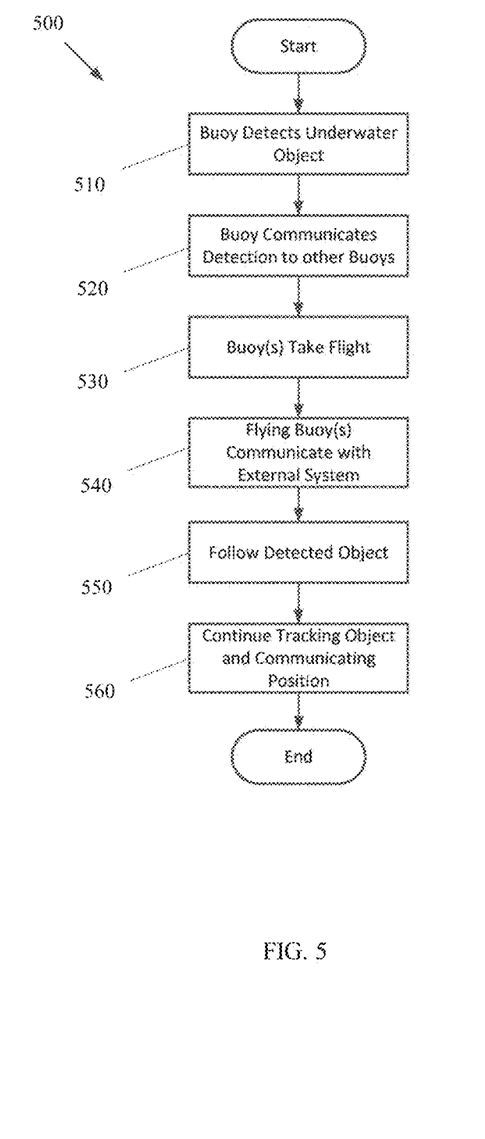
FIG. 5 illustrates a method for the detection of underwater objects using a plurality of multirotor mobile buoys.

FIG. 5 is a flowchart 500 illustrating a process for tracking underwater objects using a swarm of mobile buoys comprising multirotor mobile buoys, according to an embodiment of the present invention. The process begins with at least one buoy detecting an underwater object at 510. The detecting buoy then communicates with other buoys to inform them that the object was detected at 520. At least one buoy takes flight at 530. In some embodiments, steps 520 and 530 may be performed in reverse. At least one flying buoy then communicates with external systems, such as satellites, ships, land stations, etc. to inform them that the object was detected at 540. At least one flying buoy follows the detected object or repositions in response to the detection at 550. As discussed above, in some embodiments, the buoy may not be able to match the pace and distance traveled by the detected object. In such embodiments, new buoys in the swarm may join in tracking the object when it comes within range. Also, buoys may stop detection when the object travels out of their range. In certain embodiments, buoys may not pursue the object, but may instead rely on the positioning of the swarm to handoff detection duties and collectively track the object. The swarm of buoys then tracks the object and communicates its position to the external system as the object travels at 560.

In some embodiments, all of the buoys in the swarm on the surface that are within range can detect the presence of the target object, but they can only estimate position by comparing times of detection along with their own locations very accurately. Accordingly, at least one buoy may always be in the air to communicate with all of the buoys on the water within a certain range. All buoys may have GPS, which would allow sensory data to be accurately time-stamped. In certain embodiments, rather than having a buoy in the air at all times, all buoys may be in the water sensing. When the "event" is over, or after a certain period of time, one buoy may fly into the air to share data with external systems and allow for calculations to commence. The buoy in the air may not have to perform the calculations. Instead, the flying buoy may just allow for the sharing of time-stamped data among the buoys in range. This type of calculation is also known as time-delay on arrival (TDOA).

Thus, provided here is a multirotor mobile buoy combining MR-VTOL capability with environmentally hardened electronics, exchangeable sensor suites, and a solar recharge system in order to provide long endurance sensing in aquatic environments. The multirotor mobile buoy may perform sensing below the thermocline layer while riding on ocean currents, and utilizes a plurality of VTOL-oriented rotors when required for rapid aerial relocation. The multirotor mobile buoy provides INS/GPS capability and sensing and signal processing capabilities for detection of underwater objects, as well as solar energy harvesting for energy-independent operation. The multirotor mobile buoy may be deployed as a plurality of multiple cooperative vehicles in a particular operational area with heterogeneous sensors and may, for example, distribute themselves to guarantee a required node-density for a given desired coverage.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A multirotor mobile buoy for surface and underwater reconnaissance comprising:
   a central frame comprising,
      a central housing,
      a plurality of frame support members where each frame support member extends from the central housing and, a plurality of rotor support members where each rotor support member is coupled to the central housing, at least one of the frame support members comprising the plurality of frame support members, or a combination thereof;

a buoyant assembly coupled to the central frame where the buoyant assembly is configured to float on water;

a plurality of rotors where each rotor comprises a motor, a rotating mast coupled to the motor, a hub coupled to the rotating mast, and a plurality of rotor blades coupled to the hub, and where the each rotor is coupled to at least one rotor support member in the plurality of rotor support members, where the at least one rotor support member is coupled to the central housing, the at least one of the frame support members, or a combination thereof and where the buoyant assembly is coupled to the central frame such that the rotating mast, the hub, and the plurality of rotor blades of the each rotor is above the water when the buoyant assembly floats on water and such that the plurality of rotor blades of the each rotor is oriented to direct a thrust in a direction toward a surface of the water when the buoyant assembly floats on water;

a plurality of solar cells where each solar cell comprises a sun-facing side, where the each solar cell is coupled to at least one frame support member in the plurality of frame support members where the at least one frame support member is coupled to the central housing and the buoyant assembly is coupled to the central frame such that the sun-facing side of the each solar cell is above the water when the buoyant assembly floats on water;

a battery electrically connected to the each solar cell and electrically connected to each motor in the plurality of rotors; and a tether coupled to the central housing at a first end and coupled to a sensor configured to detect underwater objects at a second end, where the sensor is configured to sink in water and where the tether is coupled to the central housing at the first end and coupled to the sensor at the second end such that the second end of the tether is submerged in the water when the buoyant assembly floats on water.

2. The multirotor mobile buoy of claim 1 where the where central housing has a vertical axis extending through the central housing when the buoyant assembly floats on water, and where the buoyant assembly generates one or more buoyant forces when the buoyant assembly floats on water, where each of the buoyant forces is parallel to the vertical axis, and where each plurality of rotor blades in each rotor in the plurality of rotors has a plane of rotation, and the plane of rotation is substantially perpendicular to the vertical axis.

3. The multirotor mobile buoy of claim 2 where the buoyant assembly is coupled to the plurality of frame support members.

4. The multirotor mobile buoy of claim 3 where the buoyant assembly is a plurality of pontoons and where the apparatus has a total combined weight, and where each pontoon has a displacement volume, and where a weight of water having a volume equal to the displacement volume is greater than the total combined weight of the apparatus.

5. The multirotor mobile buoy of claim 4 where the each pontoon in the plurality of pontoons is coupled to at least one frame support member in the plurality of frame support members.

6. The multirotor mobile buoy of claim 2 where a reference diameter D is perpendicular to the vertical axis and surrounds the central frame and the buoyant assembly, and where the tether has a length L from the central housing to the sensor, and where the length L is at least 10 times greater than the reference diameter D.

7. The multirotor mobile buoy of claim 6 where the sensor has a mass M and the multirotor mobile buoy has a center of gravity and a center of buoyancy when the buoyant assembly floats on water, and where the center of gravity is below the center of buoyancy when the buoyant assembly floats on water and the tether has the length L and the mass M.

8. The multirotor mobile buoy of claim 2 further comprising a computing system within the central housing where the computing system is configured to receive data from the sensor.

9. The multirotor mobile buoy of claim 8 where the computing system is configured to receive data from the sensor via a communication cable where the communication cable extends from the computing system to the sensor.

10. The multirotor mobile buoy of claim 9 further comprising an onboard global positioning system and inertial navigation system (GPS/INS) configured to determine a location of the apparatus and where the computing system is configured to receive location information from the GPS/INS and control the location of the apparatus using the plurality of rotors.

11. The multirotor mobile buoy of claim 8 where the apparatus comprises an antenna and where the computing system is further configured to communicate with external systems using the antenna.

12. A multirotor mobile buoy for surface and underwater reconnaissance comprising:

a central frame comprising,
  a central housing,
  a plurality of frame support members where each frame support member extends from the central housing and,
  a plurality of rotor support members where each rotor support member is coupled to the central housing, at least one of the frame support members comprising the plurality of frame support members, or a combination thereof;

a buoyant assembly coupled to the central frame where the buoyant assembly is configured to float on water;

a plurality of rotors where each rotor comprises a motor, a rotating mast coupled to the motor, a hub coupled to the rotating mast, and a plurality of rotor blades coupled to the hub, and where the each rotor is coupled to at least one rotor support member in the plurality of rotor support members, where the at least one rotor support member is coupled to the central housing, the at least one of the frame support members, or a combination thereof and where the buoyant assembly is coupled to the central frame such that the rotating mast, the hub, and the plurality of rotor blades of the each rotor is above the water when the buoyant assembly floats on water and such that the plurality of rotor blades of the each rotor is oriented to direct a thrust in a direction toward a surface of the water when the buoyant assembly floats on water;

a plurality of solar cells where each solar cell comprises a sun-facing side, where the each solar cell is coupled to at least one frame support member in the plurality of frame support members where the at least one frame support member is coupled to the central housing and the buoyant assembly is coupled to the central frame such that the sun-facing side of the each solar cell is above the water when the buoyant assembly floats on water;

a battery electrically connected to the each solar cell and electrically connected to each motor in the plurality of rotors;

a tether having a length L coupled to the central housing at a first end and coupled to a sensor having a mass M at a second end, where the sensor is configured to sink in water and where the tether is coupled to the central housing at the first end and coupled to the sensor at the second end such that the second end of the tether is submerged in the water when the buoyant assembly floats on water, and where the multirotor mobile buoy has a center of gravity and a center of buoyancy when the buoyant assembly floats on water, and where the center of gravity is below the center of buoyancy when the buoyant assembly floats on water and the tether has the length L and the mass M; and a computing system within the central housing where the computing system is configured to receive data from the sensor.

13. The multirotor mobile buoy of claim 12 where the where central housing has a vertical axis extending through the central housing when the buoyant assembly floats on water, and where a reference diameter D is perpendicular to the vertical axis and surrounds the central frame and the buoyant assembly, and the length L of the tether is at least 10 times greater than the reference diameter D.

14. The multirotor mobile buoy of claim 13 where the buoyant assembly generates one or more buoyant forces when the buoyant assembly floats on water, where each of the buoyant forces is parallel to the vertical axis, and where each plurality of rotor blades in each rotor in the plurality of rotors has a plane of rotation, and the plane of rotation is substantially perpendicular to the vertical axis.

15. The multirotor mobile buoy of claim 9 further comprising an onboard global positioning system and inertial navigation system (GPS/INS) configured to determine a location of the apparatus and where the computing system is configured to receive location information from the GPS/INS and control the location of the apparatus using the plurality of rotors.

* * * * *